(12) United States Patent
Kawai

(10) Patent No.: US 6,959,173 B2
(45) Date of Patent: Oct. 25, 2005

(54) DOWNLOADING SERVER AND MOBILE STATION USING LOCAL-AREA WIRELESS COMMUNICATION

(75) Inventor: Takeo Kawai, Kariya (JP)

(73) Assignee: Denso Corporation, Kariya (JP)

( * ) Notice: Subject to any disclaimer, the term of this patent is extended or adjusted under 35 U.S.C. 154(b) by 36 days.

(21) Appl. No.: 10/364,279

(22) Filed: Feb. 11, 2003

(65) Prior Publication Data

US 2003/0171094 A1 Sep. 11, 2003

(30) Foreign Application Priority Data

Mar. 6, 2002 (JP) ......................................... 2002-060731

(51) Int. Cl.[7] .............................. H04B 1/38; H04Q 7/20
(52) U.S. Cl. ........................ 455/95; 455/96; 455/422.1; 455/421; 455/97; 455/98; 455/99
(58) Field of Search .............................. 455/95, 96–99, 455/422.1, 421, 437, 466, 569.2, 161.3, 345, 49, 123.1, 414.3, 517, 456.1, 4.221, 461, 552.1, 440, 404.2, 67.1, 565; 370/328; 340/991, 905, 395.25

(56) References Cited

U.S. PATENT DOCUMENTS

| | | | | |
|---|---|---|---|---|
| 5,952,940 A | * | 9/1999 | Matsumoto | ................. 340/905 |
| 6,417,781 B1 | * | 7/2002 | Matsumoto | ................. 340/901 |
| 6,597,906 B1 | * | 7/2003 | Van Leeuwen et al. | ...... 455/436 |
| 6,721,572 B1 | * | 4/2004 | Smith et al. | ............. 455/456.1 |
| 2002/0194325 A1 | * | 12/2002 | Chmaytelli et al. | ......... 709/224 |

FOREIGN PATENT DOCUMENTS

| | | | | | |
|---|---|---|---|---|---|
| JP | 2000-53449 | * | 9/2000 | ............ | H04Q/7/38 |
| JP | 2000253449 | * | 9/2000 | | |
| JP | 02003-069485 A | * | 3/2003 | ............ | H04B/7/26 |

* cited by examiner

Primary Examiner—Sonny Trinh
Assistant Examiner—Thai N. Vu
(74) Attorney, Agent, or Firm—Harness, Dickey & Pierce, PLC

(57) ABSTRACT

A server downloads data to a mobile station mounted in a vehicle through a roadside device using dedicated short range communication (DSRC). The server is capable of computing downloading transmission rate from the roadside device to the mobile station and maximum speed of the vehicle that enables completion of the downloading of the data to the mobile station. The maximum speed is computed based on the computed downloading transmission rate, a communication area of the roadside device, and size of the data. The server is further capable of notifying the maximum speed to the mobile station. By contrast, the mobile station is capable of transmitting information relating to the data to the server, receiving the data to be downloaded in the communication area of the roadside device, and notifying the maximum speed received from the server to a crew of the vehicle.

17 Claims, 9 Drawing Sheets

DOWNLOADING SERVER AND MOBILE STATION USING LOCAL-AREA WIRELESS COMMUNICATION

CROSS REFERENCE TO RELATED APPLICATIONS

This application is based on and incorporates herein by reference Japanese Patent Application No. 2002-60731 filed on Mar. 6, 2002.

FIELD OF THE INVENTION

The present invention relates to a downloading server and a mobile station in downloading data, using local-area wireless communication, from the downloading server to the mobile station through a base station. In particular, it is useful for communication between a vehicle and a roadside device using, for instance, dedicated short range communication (DSRC) as the local-area wireless communication.

BACKGROUND OF THE INVENTION

Local-area or narrow-area wireless communication can be used for exchanging data between a base station and a mobile station. In specific, dedicated short range communication (DSRC) is used for downloading data from a roadside device to a moving vehicle as the mobile station.

The local-area wireless communication involves a limited communication area, so that the moving vehicle may not completely receive the downloaded data depending on size of the communication area, vehicle's speed, size of the downloaded data.

SUMMARY OF THE INVENTION

It is an object of the present invention to complete downloading of data from a base station to a mobile station by using local-area wireless communication.

To achieve the above object, a downloading server, for downloading data to a mobile station through one of a plurality of base stations using local-area wireless communication, is provided with the following. The downloading server is capable of receiving, from the mobile station, data-related information relating to the data, computing, based on size of the data, speed-condition of the mobile station. Here, the speed-condition enables the downloading of the data to the mobile station to be completed. The server is further capable of transmitting the speed-condition to the mobile station. By contrast, a mobile station is capable of receiving the data through local-area wireless communication in the communication area of one of the plurality of the base stations and transmitting the data-related information to the downloading server. It is further capable of notifying, to a crew of the mobile station, the speed-condition received from the downloading server. The above structure enables the crew to control the speed of the mobile station so that the downloading of the data can be completed.

It is preferable that communication between the downloading server and the mobile station includes wide-area wireless communication in addition to the local-area wireless communication. It is further preferable that the mobile station is capable of transmitting current position of its own to the downloading server. The server can thereby select a certain base station through which the data are to be downloaded to the mobile station. In one embodiment, a mobile station is additionally capable of computing, based on information received from the downloading server, the speed-condition to notify to the crew.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS (First Embodiment)

Figure 1:
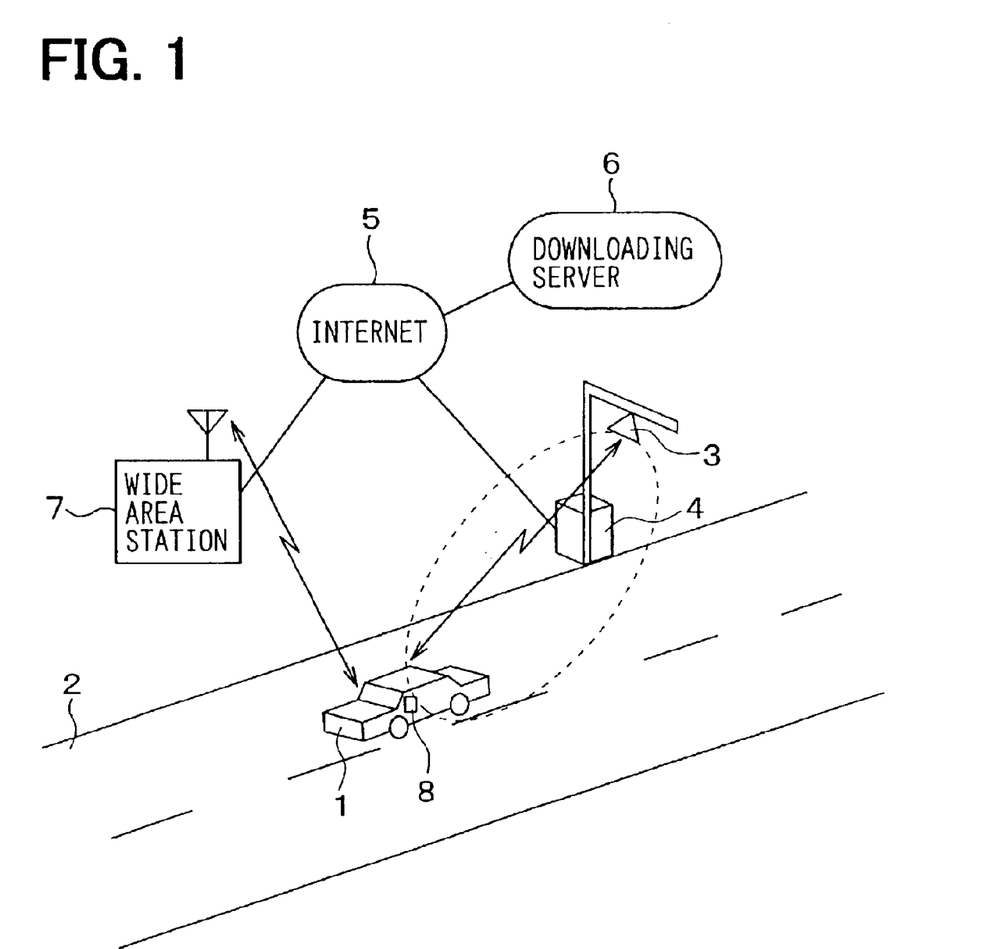
FIG. 1 is a schematic view of a downloading system according to a first embodiment of the present invention.

Referring to FIG. 1, a vehicle 1 moves on a road 2, along which a dedicated short range communication (DSRC) roadside device 4 is located with a DSRC antenna 3. The DSRC is one type of local-area or local-area wireless communication.

The DSRC roadside device 4 communicates with a downloading server 6 via the Internet 5. The downloading server 6 communicates with a wide-area wireless communication station 7 via the Internet 5. The DSRC roadside device 4 downloads program data through the DSRC antenna 3 to the vehicle 1 that passes through a communication area of the DSRC antenna 3. The DSRC roadside device 4 can change an output transmission rate in stages in the downloading of the program data.

The vehicle 1 is equipped with a wireless device 8 that has a processing unit (not shown) for processing communication or other operations. The wireless device 8 communicates with the DSRC roadside device 4 through the DSRC antenna 3 so that the program data can be downloaded from the DSRC roadside device 4 to the vehicle 1. The wireless device 8 communicates with the downloading server 6 via the wide-area wireless communication station 7. The wireless device 8 can also communicate with in-vehicle devices (not shown) such as a car navigation system and user interfaces to mutually exchange information. The wireless device 8 can therefore obtain its own current position information, a vehicle's destination, time and others, and output a received message to a notice device (not shown).

The vehicle 1 being equipped with the wireless device 8 can be thus referred to as a mobile station.

The DSRC antenna 3 intermediating between the DSRC roadside device 4 and the wireless device 8 is a directional antenna, which thereby defines a communication area or a covering area of the DSRC roadside device 4. An area within a dotted loop shown in FIG. 1 indicates a communication area of the DSRC roadside device 4. Only within the communication area, the wireless device 8 is capable of receiving downloaded data. The DSRC antenna 3 is formed as an adaptive-alley antenna so that the downloading server 6 can remotely control a directional characteristic of the DSRC antenna 3.

Figure 2:
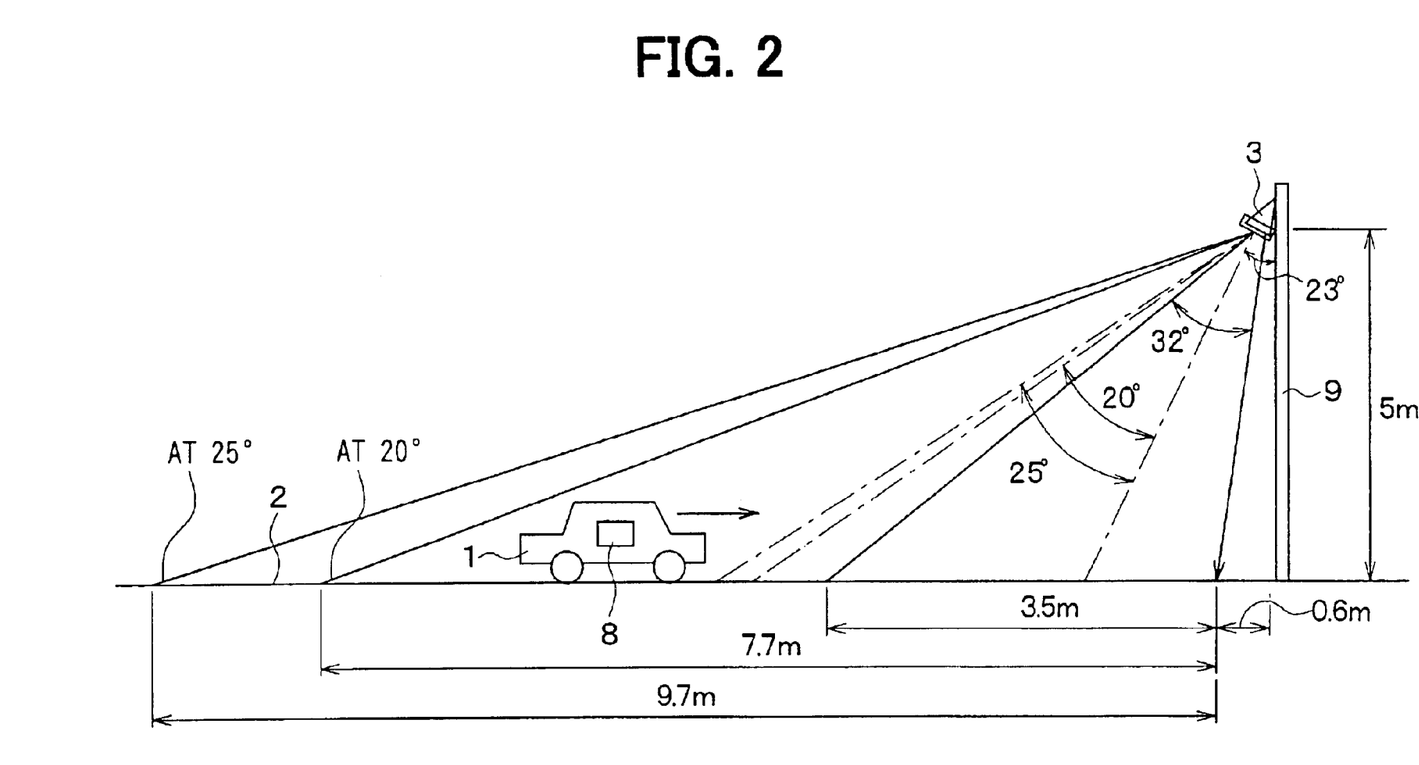
FIG. 2 is a schematic view of communication area of a DSRC roadside device.

The directional characteristic of the DSRC antenna 3 is shown in FIG. 2, where the road 2 is horizontally shown and the vehicle moves left and right. The DSRC antenna 3 is disposed at a certain height in a pole 9 along the road 2. This DSRC antenna 3 has the directional characteristic that provides with predetermined angle width of a beam, for instance 32 degree width, so that a covering area of the beam becomes a communication area of the DSRC roadside device 4. When a center of the beam (shown as a dashed line) faces an approaching vehicle at 23 degrees from a vertical line, the communication area reaches an approximately 3.5 meter point in the road 2 from the DSRC antenna 3. The center of the beam of the DSRC antenna 3 can be controlled by the downloading server 6, so that the communication area can be changed. For instance, when the center of the beam is rotated by 20 degrees or 25 degrees in addition to the above 23 degrees, the communication area is enlarged to reach a 7.7 meter point or a 9.7 meter point respectively.

As described above, the communication area is limited to reach a 10 meter point at longest. The DSRC roadside device 4 thus has a much narrower communication area than the wide-area wireless communication station 7 does, while the DSRC roadside device 4 has much higher transmission rate than the wide-area wireless communication station 7 does. Therefore the moving vehicle 1 may not stay in the communication area, depending on size of the downloaded program data, for a sufficient period for which the downloading of the program data is completed.

In this embodiment, to prevent incompletion of the downloading of the program data, the downloading server 6 is capable of notifying to the wireless device 8 of the vehicle 1 a maximum vehicle speed that allows the downloading of the program data to be completed.

Prior to the downloading of the program data, the wireless device 8 and the downloading server 6 are capable of exchanging information with each other, such as the above maximum vehicle speed or advanced downloading request information, through the wide-area wireless communication station 7.

The downloading server 6 receives current position information of the vehicle 1 from the vehicle 1 as the advanced downloading request information. The downloading server 6 thereby selects a certain DSRC roadside device 4 based on the current position information of the vehicle 1.

The downloading server 6, if needed, can control the DSRC antenna 3 to enlarge the communication area by rotating the center of the beam of the DSRC antenna 3. Here, the downloading server 6 needs to obtain, from the wireless device 8, the vehicle speed just before the downloading of the program data through the wide-area wireless communication station 7. The downloading server 6 thus computes, based on the received vehicle speed, a suitable beam angle to control the DSRC antenna 3.

Figure 3:
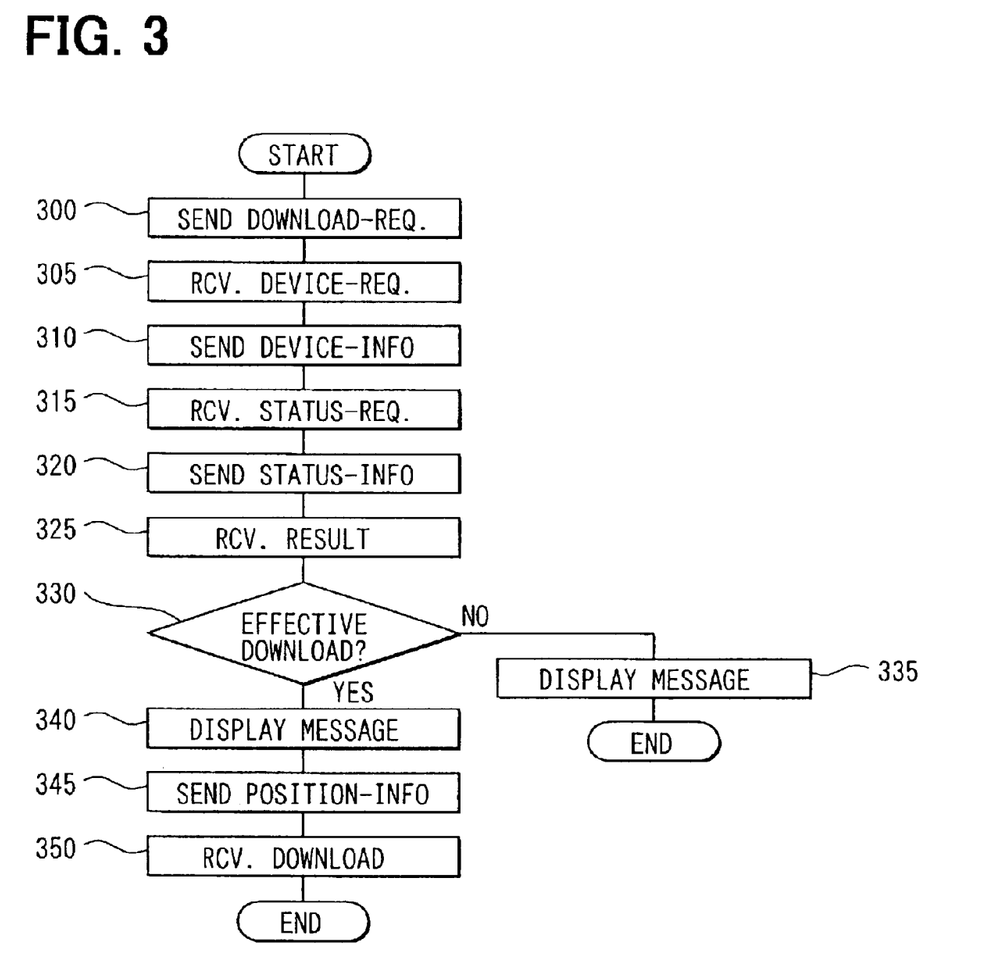
FIG. 3 is a flowchart diagram explaining a downloading process for a wireless device according to the first embodiment.

Referring to FIG. 3, operation of the wireless device 8 will be explained below regarding processing prior to start of the downloading of the program data. In this processing, communication between the wireless device 8 and the downloading server 6 is executed through the wide-area wireless communication station 7.

At Step 300, the wireless device 8 transmits to the downloading server 6 information relating to the program data whose downloading through the DSRC roadside device 4 is requested.

At Step 305, the wireless device 8 receives from the downloading server 6 a signal requesting transmission of vehicle-device information that includes specification of devices mounted in the vehicle 1.

At Step 310, the wireless device 8 transmits the vehicle-device information to the downloading server 6 based on the request. When the wireless device 8 receives, from the downloading server 6, a message of downloading incapability, that requested program data cannot be downloaded, the wireless device 8 stops further processing for the downloading.

At Step 315, the wireless device 8 receives, from the downloading server 6 a request signal indicating request for transmission of vehicle-status information such as a current position and destination of the vehicle 1, time and others.

At Step 320, the wireless device 8 transmits the vehicle-status information to the downloading server 6.

At Step 325, the wireless device 8 receives determination result of downloading probability and a message including the maximum speed of the vehicle 1 enabling the downloading of the program data to be completed.

At Step 330, the wireless device 8 determines whether the received determination result predicts the completion of the downloading of the program data.

When the completion of the downloading of the program data is determined to be not predicted, the processing proceeds to Step 335 where the received message is displayed on the notice device of the vehicle 1 without starting of the downloading of the program data. Instances of the message include, "There is no downloading spot nearby, and spots capable of downloading in SA/PA are to be displayed," and "Downloading during driving is impossible due to a large data volume, and another method will be informed."

When the completion of the downloading of the program data is determined to be predicted, the processing proceeds to Step 340 where the received message is displayed. Instances of the message include, "The program data will be downloaded in about xx minutes around YY. Please set vehicle speed to less than zz km/hour. Otherwise, the program data may not be downloaded completely."

After receiving the above message, the processing proceeds to Step 345. Here, the wireless device 8 receives, from the downloading server 6, route information to the downloading spot and periodically transmits, to the downloading server 6, the current position of its own till arriving at the downloading spot, with preparing for the downloading.

When the vehicle 1 arrives at the DSRC roadside device 4 of the downloading spot, the wireless device 8 starts operation of the downloading of the program data. Keeping running at less than the maximum speed indicated by the message enables the downloading of the program data to be completed before the vehicle 1 exits from the communication area of the DSRC roadside device 4.

Figure 4:
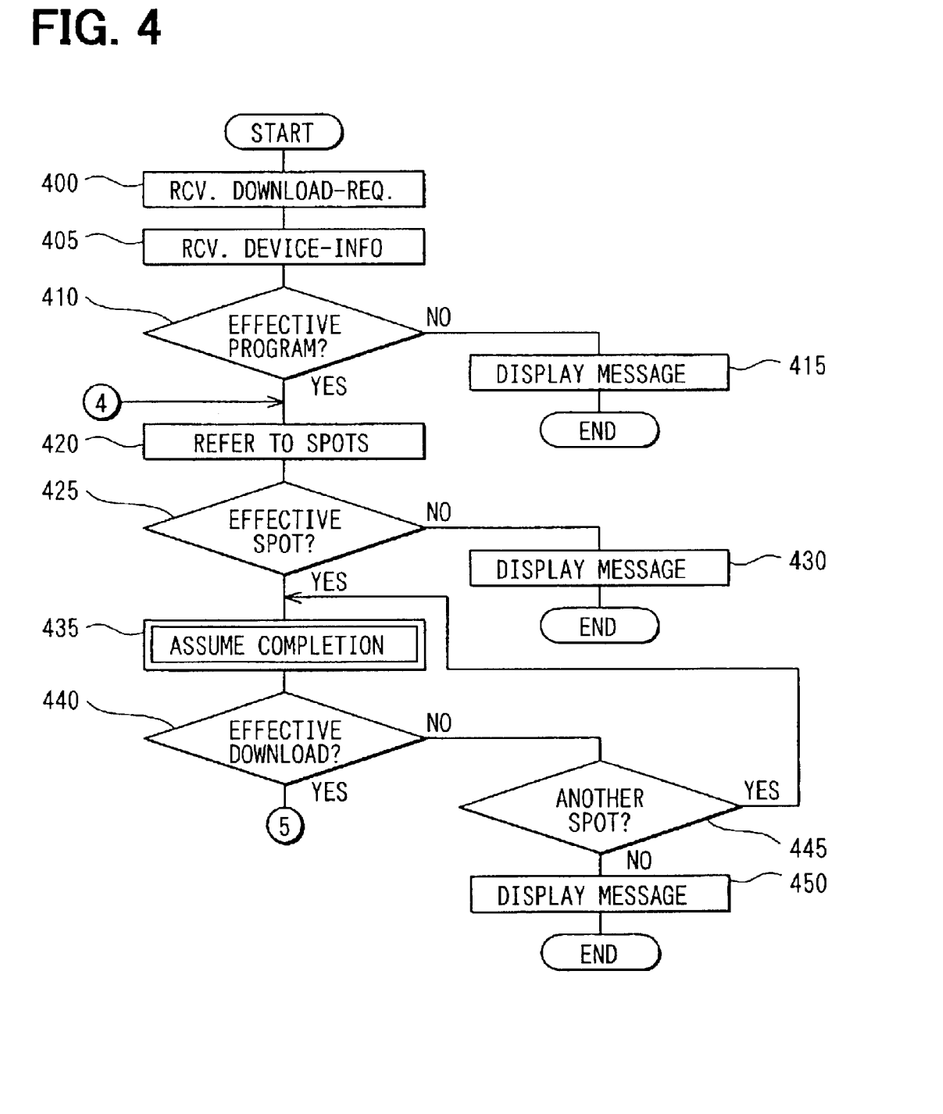
FIG. 4 is a flowchart diagram explaining a downloading process for a downloading server according to the first embodiment.
Figure 5:
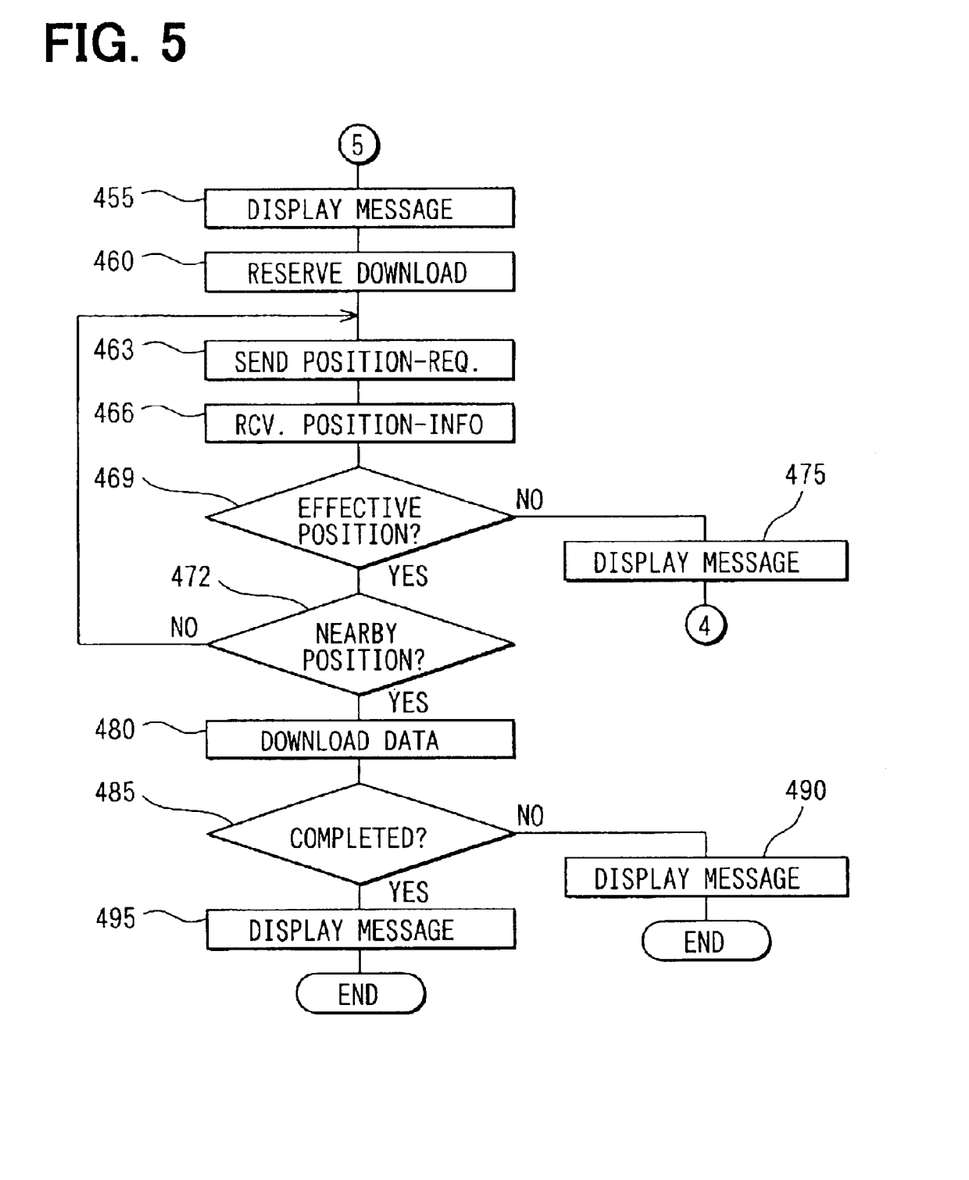
FIG. 5 is a flowchart diagram explaining the downloading process for the downloading server according to the first embodiment.

In the above process of the wireless device 8 of the vehicle 1, the downloading server 6, in contrast, executes a process as shown in FIGS. 4 and 5. Here, the communication between the wireless device 8 and the downloading server 6 is executed through the wide-area wireless communication station 7.

Referring FIG. 4, at Step 400 the downloading server 6 receives the request for downloading from the wireless device 8. Here, the information relating to the program data to be downloaded to the wireless device 8 is received from the wireless device 8.

At Step 405, the downloading server 6 selects, based on the received information, the program data to be downloaded. It then requests the vehicle-device information of the vehicle 1 from the wireless device 8 and receives the reply from the wireless device 8.

At Step 410, the downloading server 6 determines whether the program data complies with the replied vehicle-device information. That the program data complies with the vehicle-device information means that the specification of the program data can operate the vehicle devices properly. For instance, the program data having a communication system that is not supported by the wireless device 8 never complies with the vehicle-device information.

When the program data does not comply, the processing proceeds to Step 415 where a message indicating that the program data does not comply with the vehicle-device information is transmitted to the wireless device 8. Instances of the message include, "The requested program data cannot be downloaded."

When the program data complies, the processing proceeds to Step 420 where the above vehicle-status information is requested of the wireless device 8. The downloading server 6 thus receives the reply from the wireless device 8 and searches for one or several downloading spots where the program data can be downloaded.

At Step 425, the downloading server 6 determines whether the downloading spot is available during the driving. When the downloading spot is determined to be unavailable, the processing proceeds to Step 430 where a message indicating that no downloading spots are available during the driving is transmitted to the wireless device 8. The instances of the message include, "No downloading spots are available during the driving. Downloading spots in SA/PA will be displayed."

When the downloading spot is determined to be available during the driving, the processing proceeds to Step 435. The downloading server 6 computes the maximum vehicle speed at one of the selected downloading spots to assume the probability of the completion of the downloading of the program data. This processing will be explained below in detail.

At Step 440, the downloading server 6 determines whether the downloading of the program data is to be completed at the one of the selected downloading spots based on the assumption result at Step 435.

When the downloading is determined to be not completed, the processing proceeds to Step 445. Here, whether another downloading spot for the downloading, which is one of those searched at Step 420, is available during the driving is determined.

When another downloading spot is determined to be available, the processing returns to Step 435. Here, the probability of the completion of the downloading of the program data is assumed at another downloading spot. By contrast, when another downloading spot is determined to be unavailable, the processing proceeds to Step 450. A message indicating that the downloading of the program data cannot be completed is transmitted to the wireless device 8 to terminate the process. The instances of the message include, "Downloading of the program data is impossible due to a large volume of the date during the driving. Another method will be displayed."

The downloading server 6 repeats the processing at Steps 435, 440, and 445 until at least one of the selected spots is determined to be available for the completion of the downloading of the program data or until all of the selected spots are determined to be unavailable for the completion of the downloading of the program data.

When the downloading of the program data is determined to be completed, the processing proceeds to Step 455. Here, next referring to FIG. 5, a message indicating that the downloading of the program data can be completed and the maximum speed of the vehicle 1 is transmitted to the wireless device 8. The instances of the message include, "The program data will be downloaded in about xx minutes around YY. Please set vehicle speed to less than zz km/hour. Otherwise, the program data may not be downloaded completely."

Thereafter, the processing proceeds to Step 460 where the downloading server 6 executes downloading reservation for the vehicle 1. In this reservation process, a route to the downloading spot according to the current position of the vehicle 1 is set and transmitted to the vehicle 1. A plurality of the routes can be set simultaneously.

Next at Step 463, the downloading server 6 requests transmitting of the current position information to the vehicle 1.

At Step 469, the downloading server 6 determines whether the current position of the vehicle 1 which is most recently received matches with any one of the routes provided previously.

When the current position is determined not to be matching, the downloading server 6 assumes that the vehicle 1 does not approach the reserved downloading spot and transmits a message indicating that another downloading spot will be indicated, at Step 475. The instances of the message include, "The reserved downloading spot will be modified."

When the current position is determined to be matching, the processing proceeds to Step 472 where whether the vehicle 1 is closely approaching the reserved downloading spot is determined. The determination of closely approaching the spot is done by determining that the vehicle 1 is located within a radius of xx meters of the reserved downloading spot.

When the vehicle 1 is determined to be not closely approaching, the processing returns to Step 463. Steps from 463 through 472 are repeated until the vehicle 1 closely approaches the DSRC roadside device 4 of the reserved downloading spot at the predetermined distance.

When the vehicle 1 is determined to be closely approaching, the downloading server 6 controls the DSRC roadside device 4 to download the program data at Step 480. When the vehicle 1 exits from the communication area, the completion of the downloading is determined based on communication with the wireless device 8 at Step 485.

When the completion of the downloading is determined to be unsuccessful, the processing proceeds to Step 490 where a message indicating the unsuccessful downloading is transmitted to the wireless device 8. The instances of the message include, "The downloading was unsuccessful. Please retry."

When the completion of the downloading is determined to be successful, the processing proceeds to Step 495 where a message indicating the successful downloading is transmitted to the wireless device 8. The instances of the message include, "The downloading was successful."

As explained above, the downloading server 6 transmits, to the wireless device 8 that requested the downloading of the program data, the effective downloading spot and the maximum speed of the vehicle 1 to enable the downloading of the program data to the wireless device 8 to be completed.

Next, the detail of Step 435, the assumption of the downloading probability of the program data, will be explained below, referring to FIG. 6.

At Step 510 the downloading server 6 obtains information necessary for assuming the probability of the downloading. The necessary information means a size of the downloaded program data, weather information, and past results for transmission rate of the DSRC roadside device 4. The weather information enables assumption of variation of the transmission rate and transmission quality according to variation of radio wave propagation condition that depends on the weather. The past results of the transmission rate include an averaged transmission rate of the DSRC roadside device 4 for a recent predetermined period.

At Step 515, based on the above information, time for the downloading is computed. In the computation, a downloading transmission rate for this time is assumed based on the past results of the downloading transmission rate and the present weather status. Here, the above averaged transmission rate for the recent predetermined period can be directly used for the transmission rate for this time. While setting the communication area of the DSRC roadside device 4 to a narrower value than an actual value, the necessary time for the completion of the downloading is computed with a predetermined accuracy, for instance not less than 99%. A parameter relating to the output transmission rate from the DSRC roadside device 4 is initialized to a default value.

At Step 520, other parameters such as the angle of the beam center of the DSRC antenna and the communication area due to the shift of the angle of the beam center are initialized to default values.

At Step 525, based on the necessary time for the completion of the downloading and the communication area, the maximum speed of the vehicle 1 is computed.

At Step 530, whether the maximum speed is more than a speed suitable for driving a vehicle is determined. The speed suitable for the driving depends on road status that is previously set based on an averaged speed of vehicles and traffic density of the road with considering safety of the driving.

When the maximum speed is determined to be more than the speed suitable for the driving, the processing proceeds to Step 535. Here, the completion of the downloading is determined to be probable and the process for the assumption of the downloading probability is terminated.

When the maximum speed is determined to be not more than the speed suitable for the driving, the processing proceeds to Step 540. Here, a parameter of the angle of the beam center of the DSRC antenna 3 is increased by 5 degrees, so that the communication area is enlarged accordingly.

At Step 545, whether the parameter of the angle of the beam center is within a predetermined value is determined.

When the parameter is determined to be within the predetermined value, the processing returns to Step 525 where the maximum speed is newly computed based on the modified parameter. A loop of Steps 525, 530, 540, 545, and 525 is repeated until the maximum speed is determined to be more than the speed suitable for the driving or until the parameter of the angle of the beam center is determined to be not within the predetermined.

At Step 545, the parameter of the angle of the beam center is determined to be not within the predetermined, the processing proceeds to Step 550. Here, whether the output transmission rate from the DSRC roadside device 4 can be increased by one step is determined.

When the output transmission rate is determined to be able to be increased by one step, the processing proceeds to Step 555 where the output transmission rate is increased by one step. The processing then returns to Step 515 and the necessary time for the downloading is newly computed based on the increased output transmission rate.

When the output transmission rate is determined to be unable to be increased, the processing proceeds to Step 560. For instance, when a maximum output transmission rate has been already set, the output transmission rate is determined to be unable to be increased. Here, the completion of the downloading is determined to be improbable and the process of the assumption of the downloading probability is terminated.

In the execution of the downloading, the parameters of the angle of the beam center determined at Step 520 or 540 and the output transmission rate of the DSRC roadside device 4 set at Step 515 or 555 are practically adopted in the DSRC roadside device 4.

(Second Embodiment)

Figure 6:
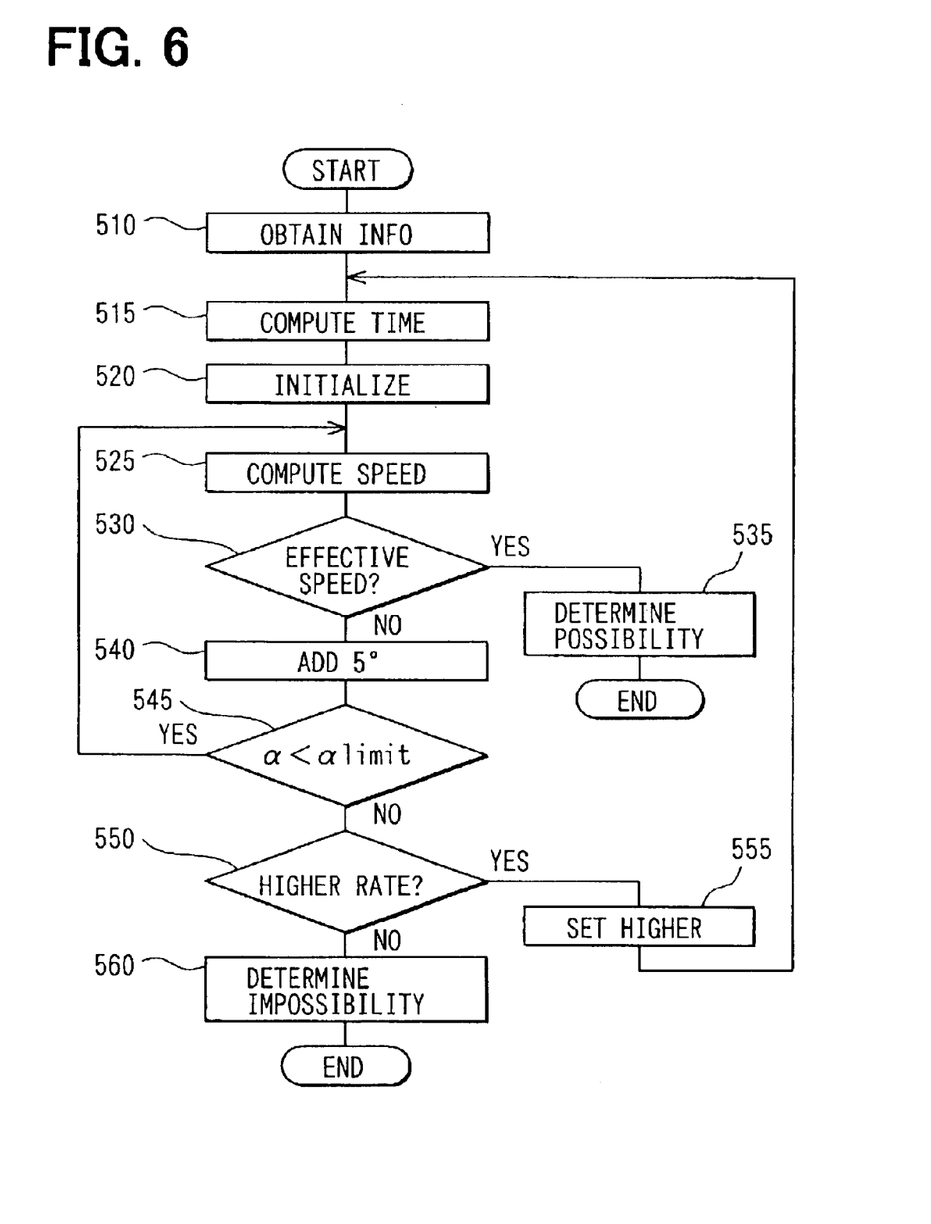
FIG. 6 is a flowchart diagram explaining an assumption process of completion of the downloading.

In a second embodiment, the assumption of the probability of the downloading of the program data is executed in the wireless device 8 mounted in the vehicle 1, while in the first embodiment it is executed in the loading server 6 at Step 435 in FIG. 4 or Steps 510 to 560 in FIG. 6. Here, the assumption of the probability of the downloading includes the computation of the maximum vehicle speed.

Structure of a downloading system between the wireless device 8 and the DSRC roadside device 4 is the same as that of the first embodiment shown in FIGS. 1 and 2. Additionally, operation of the DSRC antenna 3 and the DSRC roadside device 4 is the same as that of the first embodiment.

Figure 7:
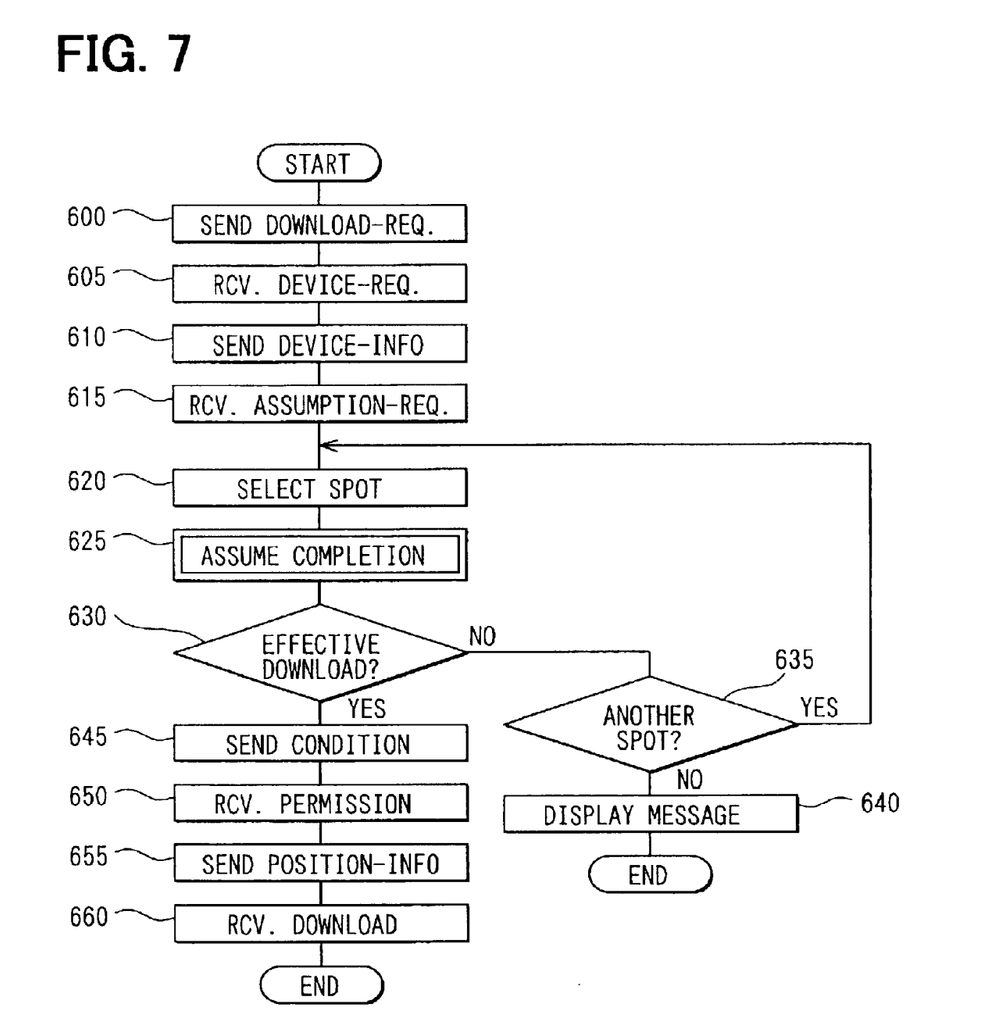
FIG. 7 is a flowchart diagram explaining a downloading process for a wireless device according to a second embodiment.

Referring to FIG. 7, operation of the wireless device 8 will be explained below regarding processing prior to start of the downloading of the program data. In this processing, communication between the wireless device 8 and the downloading server 6 is executed through the wide-area wireless communication station 7. The same processing as that of the first embodiment will be abbreviated below.

Processing from the downloading request to the transmission of the vehicle-device information of Steps 600 to 610 is the same as that of Steps 300 to 310 shown in FIG. 3.

At Step 615, the wireless device 8 receives, from the downloading server 6, a request signal indicating a request for the assumption of the probability of the downloading of the program data. Here, the wireless device 8 receives, from the downloading server 6, various pieces of information required for the assumption. The various pieces of the information include list information of downloading spots, program size to be downloaded. They further include downloading transmission rate information that contains antenna beam characteristics of the DSRC roadside device 4, weather information affecting on antenna characteristics, and the output transmission rate of the DSRC roadside device 4.

At Step 620, the wireless device 8 selects, from the list information of the downloading spots, a certain spot to assume the downloading probability at Step 625. The processing at Step 625 is equivalent to that of the first embodiment explained in FIG. 6, while the wireless device 8, instead of the downloading server 6, executes the processing in the second embodiment.

At Step 630, the wireless device 8 determines whether the completion of the downloading is predicted from a result of Step 625. When the completion of the downloading of the program data is determined to be not predicted, the processing proceeds to Step 635. Here, whether another downloading spot for the downloading, which is one of those included in the list information received at Step 615, is available during the driving is determined.

When another downloading spot is determined to be unavailable, the processing proceeds to Step 640. The wireless device 8 notifies to the downloading server 6 that the downloading is impossible. The wireless device 8 receives from the downloading server 6 a message indicating that the downloading of the program data is not completed to notify to the crew of the vehicle 1 by displaying the message on the notice device of the vehicle 1. When another downloading spot is determined to be available, the processing returns to Step 620. Here, the wireless device 8 selects one of the remaining spots and assumes the probability of completion of the downloading of the program data at the newly selected spot.

When the completion of the downloading of the program data is determined to be predicted, the processing proceeds to Step 645. Here, the wireless device 8 transmits information indicating that the downloading of the program data can be completed, and the maximum speed of the vehicle 1 is transmitted to the downloading server 6. Next at Step 650, the wireless device 8 receives from the downloading server 6 a message indicating permission of the downloading. The instances of the message include, "The program data will be downloaded in about xx minutes around YY. Please set vehicle speed to less than zz km/hour. Otherwise, the program data may not be downloaded completely." The wireless device 8 then displays the message to notify to the crew.

Thereafter, the processing proceeds to Step 655 where the downloading is prepared and then to Step 660 where the downloading is executed. The processing at Steps 655 and 660 is equivalent to that at Steps 345 and 350 shown in FIG. 3.

Figure 8:
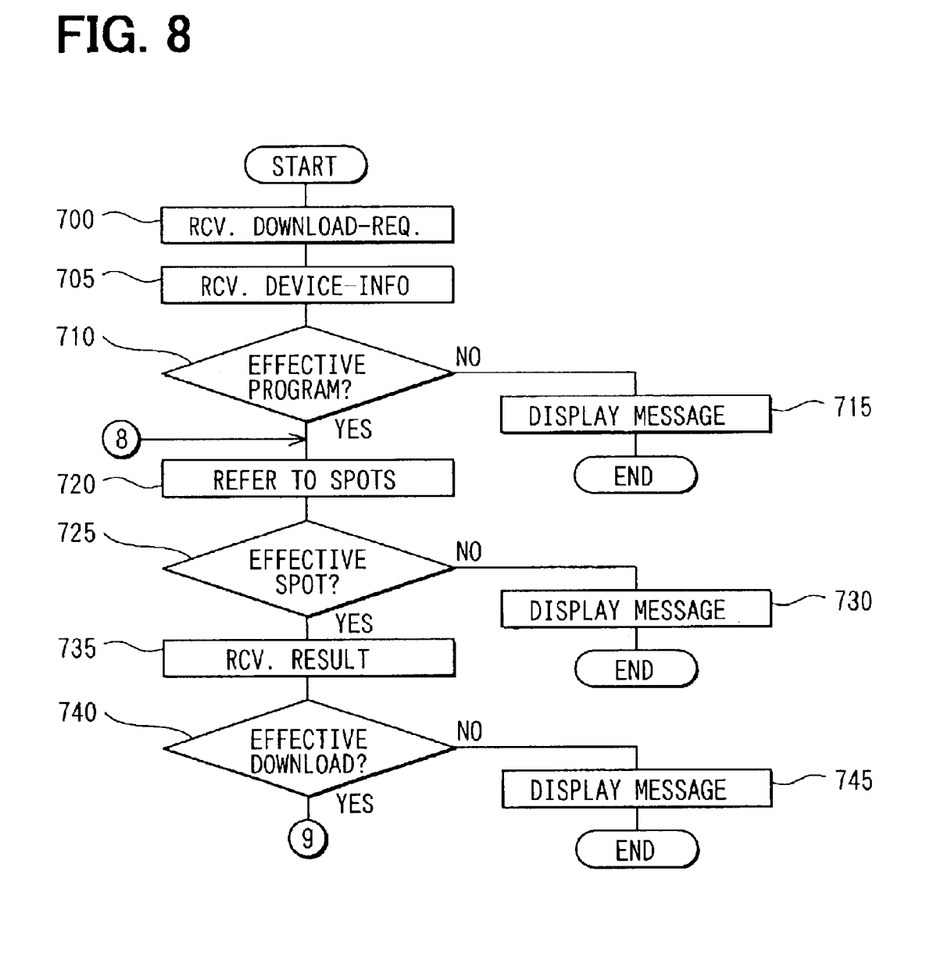
FIG. 8 is a flowchart diagram explaining the downloading process for the downloading server according to the second embodiment.
Figure 9:
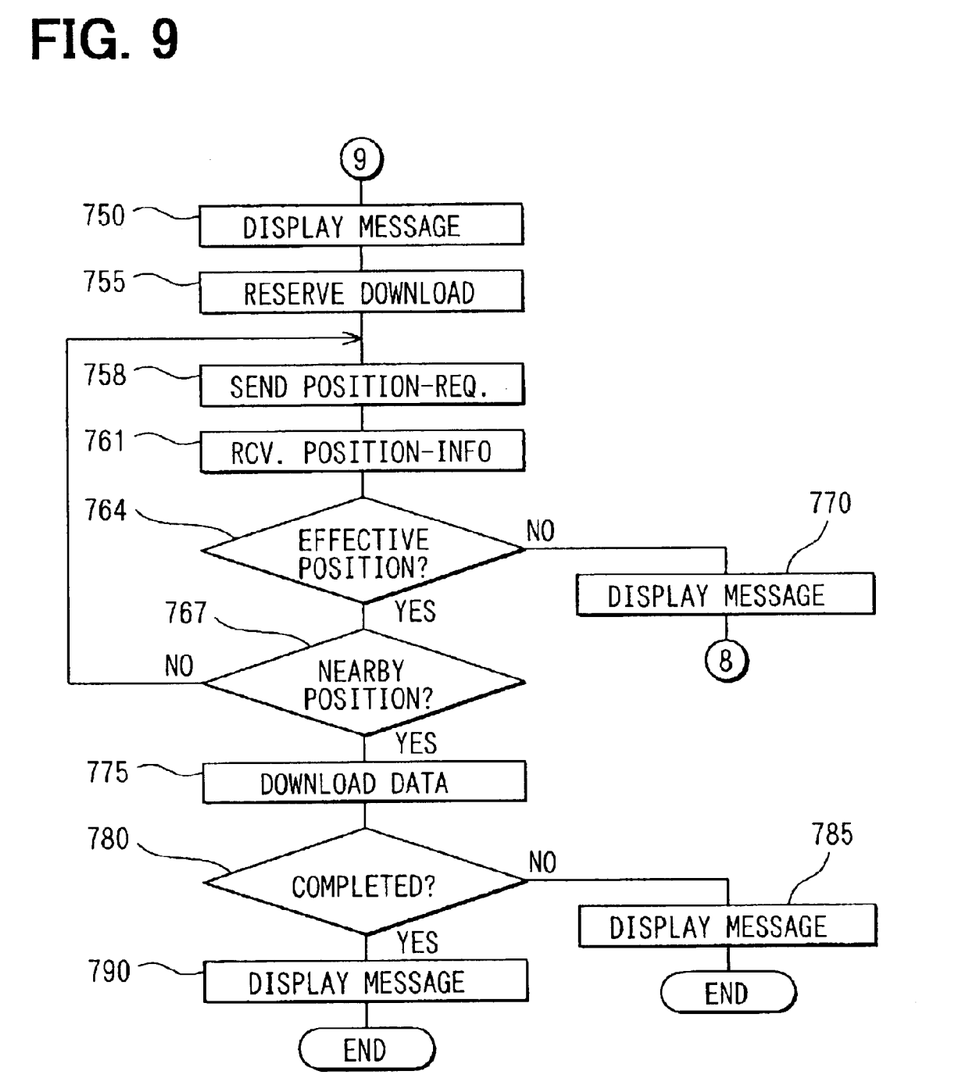
FIG. 9 is a flowchart diagram explaining the downloading process for the downloading server according to the second embodiment.

In the above process of the wireless device 8 of the vehicle 1, the downloading server 6, in contrast, executes the process as shown in FIGS. 8 and 9. Here, the communication between the wireless device 8 and the downloading server 6 is executed through the wide-area wireless communication station 7. Here, the same processing as that of the first embodiment will be abbreviated below.

The downloading server 6 receives the request for the downloading from the wireless device 8 and determines the compliance of the program data to be downloaded with the devices of the vehicle 1. It further determines whether the downloading spot is available and transmits to the wireless device 8 messages if needed. The processing executed at Steps 700 to 730 is equivalent to that at Steps 400 to 430 in FIG. 4.

When, at Step 725, the downloading server 6 determines that the downloading spot is available during the driving, the processing proceeds to Step 735. Here, the downloading server 6 transmits to the wireless device 8 a signal indicating request of assumption of probability of the downloading. It then receives a result of assumption as a response to the request.

At Step 740, the downloading server 6 determines whether the downloading can be completed based on the result of the assumption.

When the downloading is determined to be unable to be completed, the processing proceeds to Step 745 where a message indicating that the downloading cannot be completed is transmitted to the wireless device 8.

At Steps 755 to 790 posterior to this processing, reservation and execution of the downloading are held, which are equivalent to that at Steps 460 to 495 in FIG. 5.

(Modification)

The first and second embodiments can be modified below.

Although the communication between the downloading server 6 and the wireless device 8 is executed through the wide-area wireless communication station 7, it can be executed, without the wide-area wireless communication station 7, with using some of the DSRC roadside devices located near the vehicle 1.

Although the communication among the downloading server 6, the DSRC roadside device 4, and the wide-area wireless communication station 7 is executed via the Internet 5 using a wired line, it can be executed via an exclusive or private line or using a wireless line.

Although the antenna with the adaptive-alley structure is adopted in the DSRC antenna 3 so that the directional characteristic can be modified remotely, an antenna without the adaptive-alley structure can be used with mechanically modifying the antenna angle.

Although the wireless device 8 obtains the current position of the vehicle 1 from the car navigation system in the vehicle 1, the wireless device 8 can be equipped with a global positioning system (GPS) receiver to obtain the current position.

Although the DSRC roadside device 4 is used for the downloading of the program data, any other local-area wireless communication such as a vehicle information and communication system (VICS) can be used. In addition, other local-area wireless communication further include a local area network (wireless LAN) compliant with institute of electrical and electronic engineers (IEEE) 802.11b, Bluetooth communication (Bluetooth is a registered trade mark), or infrared communication.

Although the maximum vehicle speed is adopted as a speed-condition that enables the downloading of the program data to be completed, the speed-condition can be a desirable averaged vehicle speed within the communication area or minimum staying period within the communication area.

Although the notice device separately mounted in the vehicle 1 is used for the notification to the crew of the vehicle, the wireless device 8 can be equipped with a displaying unit to notify to the crew. The notice device can be a character displaying type, an image displaying type, or a voice outputting type.

Although the maximum speed is controlled by operation of the crew, an automatic cruise control system, if it is provided in the vehicle 1, can control to modify the vehicle speed to less than the maximum speed.

Although the program data are downloaded, other data such as audio data or image data can be downloaded.

In the second embodiment, the wireless device 8 notifies to the crew the maximum speed at Step 650 after receiving the permission of the downloading from the downloading server 6. However, the wireless device 8 can notify to the crew the maximum speed as soon as the maximum speed is fixed at Step 630 without receiving the permission of the downloading server 6.

The processing at each Step in the flowcharts can be materialized by not only a software method but also a hardware method.

The completion of the downloading of the data means not only the completion of the downloading of the entire data but also the completion of the downloading of a divided part of the data when the data previously are divided into several parts.

What is claimed is:

1. A downloading server for downloading data, using local-area wireless communication, to a mobile station through only a single base station having a local-area wireless communication area, the downloading server comprising:

data-related information receiving means for receiving, from the mobile station, data-related information relating to the data;

speed-condition computing means for computing, based on size of the data, speed-condition of the mobile station, wherein the speed-condition enables the downloading of the data to the mobile station from the single base station to be completed;

downloading information transmitting means for transmitting downloading information to the mobile station; and downloading determining means for determining whether the downloading of the data to the mobile station can be completed using the computed speed-condition of the mobile station through the single base station, wherein, when the downloading is determined to be able to be completed using the computed speed-condition through the single base station, the downloading information transmitting means transmits the computed speed-condition as the downloading information, and wherein, when the downloading is determined not to be able to be completed using the computed speed-condition through the single base station, the downloading information transmitting means transmits, as the downloading information, that the downloading is determined not to be able to be completed.

2. A downloading server according to claim 1, further comprising:

transmission rate estimating means for estimating a transmission rate of the downloading of the data, wherein the speed-condition computing means computes the speed-condition based on each communication area of a plurality of the base stations, the size of the data, and the transmission rate.

3. A downloading server according to claim 2, wherein the transmission rate estimating means estimates the transmission rate for the downloading of the data based on an averaged transmission rate, for a recent predetermined period, for the downloading of the data from each base station.

4. A downloading server according to claim 1, wherein the data-related information and the downloading information are received and transmitted respectively through wide-area wireless communication.

5. A downloading server according to claim 1, further comprising:

base station selecting means for selecting, from a plurality of the base stations, the single base station through which the data are to be downloaded to the mobile station, wherein the single base station is selected based on current position information of the mobile station, wherein the current position is received from the mobile station.

6. A mobile station which has a crew and to which data are downloaded through only a single base station having a local-area wireless communication area from a downloading server including:

data-related information receiving means for receiving, from the mobile station, data-related information relating to the data;

speed-condition computing means for computing, based on size of the data, speed-condition of the mobile station, wherein the speed-condition enables the downloading of the data from the single base station to be completed;

downloading information transmitting means for transmitting downloading information to the mobile station; and downloading determining means for determining whether the downloading of the data can be completed using the computed speed-condition of the mobile station through the single base station, wherein, when the downloading is determined to be able to be completed using the computed speed-condition through the single base station, the downloading information transmitting means transmits the computed speed-condition as the downloading information, and wherein, when the downloading is determined not to be able to be completed using the computed speed-condition through the single base station, the downloading information transmitting means transmits, as the downloading information, downloading impossibility information indicating that the downloading is determined not to be able to be completed, the mobile station comprising:

local-area wireless communication means for receiving the data through local-area wireless communication in the communication area of the base station;

data-related information transmitting means for transmitting the data-related information to the downloading server; and downloading information notifying means for notifying the crew of the downloading information received from the downloading server; wherein when the downloading information received from the downloading server is the speed-condition, the downloading of the data is to be started, and when the downloading information received from the downloading server is the downloading impossibility information, the downloading of the data is to be not started.

7. A mobile station according to claim 6, wherein the data-related information and the downloading information are transmitted and received respectively through wide-area wireless communication.

8. A mobile station which has a crew and to which data are downloaded through only a single base station having a local-area wireless communication area from a downloading server including:

data-related information receiving means for receiving, from the mobile station, data-related information relating to the data;

base station selecting means for selecting, from a plurality of the base stations, the single base station of the plurality of base stations through which the data are downloaded to the mobile station, based on current position information of the mobile station;

speed-condition computing means for computing, based on size of the data and information of the selected given base station, speed-condition of the mobile station, wherein the speed-condition enables the downloading of the data to be completed;

downloading information transmitting means for transmitting the speed-condition downloading information to the mobile; and downloading determining means for determining whether the downloading of the data is able to be completed using the computed speed-condition of the mobile station through the single base station; wherein when the downloading is determined to be able to be completed using the computed speed-condition through the single base station, the downloading information transmitting means transmits the computed speed-condition as the downloading information, and when the downloading is determined not to be able to be completed using the computed speed-condition through the single base station, the downloading information transmitting means transmits, as the downloading information, downloading impossibility information indicating that the downloading is determined not to be able to be completed, the mobile station comprising:

local-area wireless communication means for receiving the data through local-area wireless communication in a respective communication area of one of the plurality of the base stations;

data-related information transmitting means for transmitting the data-related information to the downloading server;

current-position information transmitting means for transmitting to the downloading server the current position information; and downloading information notifying means for notifying the crew of the downloading information received from the downloading server; wherein when the downloading information received from the downloading server is the speed-condition, the downloading of the data is to be started, and when the downloading information received from the downloading server is the downloading impossibility information, the downloading of the data is to be not started.

9. A mobile station according to claim 8, wherein the data-related information and the current position information are transmitted through wide-area wireless communication and the downloading information is received through the wide-area wireless communication.

10. A mobile station which has a crew and to which data are downloaded from a downloading server through only one base station of a plurality of base stations having respective local-area wireless communication areas, the mobile station comprising:

local-area wireless communication means for receiving the data through local-area wireless communication in the communication area of the one base station;

data-related information transmitting means for transmitting, to the downloading server, data-related information relating to the data;

base-station-related information receiving means for receiving information relating to a given base station of the plurality of base stations for downloading and size of the data, both of which the downloading server replies based on the transmitted data-related information;

speed-condition computing means for computing speed-condition that enables the downloading of the data to be completed through only the given base station, wherein the speed-condition is computed based on the base-station-related;

determining means for determining whether or not the downloading of the data can be completed through only the given base station based on the computed speed-condition; and downloading information notifying means for notifying the crew of the computed speed-condition when the downloading of the data is determined to be able to be completed, and of downloading impossibility information when the downloading of the data is determined not to be able to be not completed.

11. A mobile station according to claim 10, wherein the information relating to the given base station includes information relating to the communication area of the given base station and information relating to a transmission rate of the given base station, and wherein the speed-condition computing means computes the speed-condition based on the size of the data, the information relating to the communication area of the given base station, and the information relating to the transmission rate of the given base station.

12. A mobile station according to claim 11, wherein the information relating to the transmission rate includes an averaged downloading transmission rate for a recent predetermined period, and wherein the speed-condition computing means computes the speed-condition based on the size of the data, the information relating to the communication area of the given base station, and the averaged downloading transmission rate of the given base station.

13. A mobile station according to claim 10, wherein the data-related information and the base-station-related information are transmitted and received respectively through wide-area wireless communication.

14. A downloading method used in a downloading server, using local-area wireless communication, to a mobile station through one base station of a plurality of base stations having local-area wireless communication areas, the method comprising steps of:

receiving, from the mobile station, data-related information relating to the data;

computing, based on size of the data, speed-condition of the mobile station, wherein the speed-condition enables the downloading of the data to the mobile station to be completed; and determining whether the downloading of the data to the mobile station can be completed using the computed speed-condition of the mobile station through only a single base station of the plurality of base station; wherein when the downloading is determined to be able to be completed using the computed speed-condition through only the single base station, the computed speed-condition is transmitted to the mobile station, and wherein, when the downloading is determined not to be able to be completed using the computed speed-condition through only the single base station, that the downloading is determined to be not completed is transmitted to the mobile station.

15. A downloading method used in a mobile station which has a crew and to which data are downloaded through one base station of a plurality of base stations having local-area wireless communication areas from a downloading server including:

data-related information receiving means for receiving, from the mobile station, data-related information relating to the data;

speed-condition computing means for computing, based on size of the data, speed-condition of the mobile station, wherein the speed-condition enables the downloading of the data from the one base station to be completed;

downloading information transmitting means for transmitting downloading information to the mobile station; and downloading determining means for determining whether the downloading of the data to the mobile station can be completed using the computed speed-condition of the mobile station through only a single base station of the plurality of base stations; wherein when the downloading is determined to be able to be completed using the computed speed-condition through only the single base station, the downloading information transmitting means transmits the computed speed-condition as the downloading information, and when the downloading is determined not to be able to be completed using the computed speed-condition through only the single base station, the downloading information transmitting means transmits, as the downloading information, downloading impossibility information indicating that the downloading is determined to be not completed, the downloading method comprising steps of:

transmitting the data-related information to the downloading server; and notifying the crew of the downloading information received from the downloading server; wherein when the downloading information received from the downloading server is the speed-condition, the downloading of the data by receiving the data in the communication area of the one base station is to be started, and when the downloading information received from the downloading server is the downloading impossibility information, the downloading of the data is to be not started.

16. A downloading method used in a mobile station which has a crew and to which data are downloaded through one base station of a plurality of base stations having local-area wireless communication areas from a downloading server including:

data-related information receiving means for receiving, from the mobile station, data-related information relating to the data;

base station selecting means for selecting, from the plurality of the base stations, a given base station of the plurality of base stations through which the data are downloaded to the mobile station, based on current position information of the mobile station;

speed-condition computing means for computing, based on size of the data and information of the given base station, speed-condition of the mobile station, wherein the speed-condition enables the downloading of the data from the given base station to be completed;

downloading information transmitting means for transmitting downloading information to the mobile station; and downloading determining means for determining whether the downloading of the data to the mobile station can be completed using the computed speed-condition of the mobile station through only the given base station; wherein when the downloading is determined to be able to be completed using the computed speed-condition through only the given base station, the downloading information transmitting means transmits the computed speed-condition as the downloading information, and when the downloading is determined not to be able to be completed using the computed speed-condition through only the given base station, the downloading information transmitting means transmits, as the downloading information, downloading impossibility information indicating that the downloading is determined to be not completed, the downloading method comprising steps of:

transmitting the data-related information and the current position information to the downloading server; and notifying the crew of the downloading information received from the downloading server; wherein when the downloading information received from the downloading server is the speed-condition, the downloading of the data by receiving the data in the communication area of the given base station is to be started, and when the downloading information received from the downloading server is the downloading impossibility information, the downloading of the data is to be not started.

17. A downloading method used in a mobile station which has a crew and to which data are downloaded from a downloading server using local-area wireless communication in a communication area of one base station of a plurality of base stations having respective local-area wireless communication areas, the downloading method comprising steps of:

transmitting data-related information relating to the data to the downloading server;

receiving base-station-related information relating to a given base station of the plurality of base stations for downloading and size of the data, both of which the downloading server replies based on the transmitted data-related information;

computing speed-condition that enables the downloading of the data to be completed through only the given base station, wherein the speed-condition is computed based on the base-station-related information;

determining whether or not the downloading of the data can be completed through only the given base station based on the computed speed-condition; and notifying the crew of the computed speed-condition when the downloading of the data is determined to be able to be completed, and of downloading impossibility information when the downloading of the data is determined not to be able to be completed.

* * * * *